United States Patent
Niu

(10) Patent No.: US 11,487,966 B2
(45) Date of Patent: Nov. 1, 2022

(54) IMAGE PROCESSING METHOD AND APPARATUS FOR TARGET RECOGNITION

(71) Applicant: Hangzhou Hikvision Digital Technology Co., Ltd., Hangzhou (CN)

(72) Inventor: Yi Niu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/266,073

(22) PCT Filed: Aug. 13, 2019

(86) PCT No.: PCT/CN2019/100363
§ 371 (c)(1),
(2) Date: Feb. 4, 2021

(87) PCT Pub. No.: WO2020/038254
PCT Pub. Date: Feb. 27, 2020

(65) Prior Publication Data
US 2021/0303919 A1    Sep. 30, 2021

(30) Foreign Application Priority Data
Aug. 23, 2018  (CN) .......................... 201810969026.5

(51) Int. Cl.
*G06K 9/00* (2022.01)
*G06K 9/62* (2022.01)
*G06V 10/46* (2022.01)

(52) U.S. Cl.
CPC .......... *G06K 9/6232* (2013.01); *G06K 9/629* (2013.01); *G06V 10/462* (2022.01); *G06V 2201/07* (2022.01)

(58) Field of Classification Search
CPC .... G06K 9/6232; G06K 9/4671; G06K 9/629; G06K 2209/21; G06K 9/036;
(Continued)

(56) References Cited

U.S. PATENT DOCUMENTS 9,626,577 B1 * 4/2017 Yu .......................... G06K 9/036
10,467,743 B1 * 11/2019 Wang ................... G06K 9/3233
(Continued)

FOREIGN PATENT DOCUMENTS

| CN | 101853504 | 10/2010 |
| CN | 104185981 | 12/2014 |

(Continued)

OTHER PUBLICATIONS

Chernov et al., "Image quality assessment for video stream recognition systems" *Proceedings of SPIE* 2018, 10696, 8 pages.
(Continued)

*Primary Examiner* — Dhaval V Patel
(74) *Attorney, Agent, or Firm* — Norton Rose Fulbright US LLP

(57) ABSTRACT

An image processing method and apparatus for target recognition is disclosed. The method includes: inputting N frames of images into a quality evaluation network model; determining, with the quality evaluation network model, a feature vector of each of the N frames of images according to an attention weight of a preset sub-region image and M quality evaluation parameters; determining quality evaluation values of the N frames of images according to the feature vectors of the N frames of images; determining a target image or a target vector for target recognition according to the quality evaluation values of the N frames of images. The feature vector of each frame of image is determined based on the attention weight of the sub-region image and M quality evaluation parameters.

15 Claims, 8 Drawing Sheets

(58) Field of Classification Search
CPC .. G06K 9/3233; G06K 9/6271; G06K 9/6289; G06K 9/00771; G06K 9/00624; G06K 9/4604; G06T 2207/20021; G06T 2207/20081; G06T 2207/20084; G06T 2207/20221; G06T 2207/30168; G06T 5/50; G06T 7/001

See application file for complete search history.

(56) References Cited

U.S. PATENT DOCUMENTS

| | | | |
|---|---|---|---|
| 2005/0089246 | A1 | 4/2005 | Luo |
| 2017/0177975 | A1 | 6/2017 | Yu et al. |
| 2018/0174046 | A1* | 6/2018 | Xiao .................. G06K 9/00362 |
| 2019/0122038 | A1* | 4/2019 | Lai ....................... G06K 9/3233 |

FOREIGN PATENT DOCUMENTS

| | | |
|---|---|---|
| CN | 104994735 | 10/2015 |
| CN | 105678232 | 6/2016 |
| CN | 106778867 | 5/2017 |
| CN | 106920229 | 7/2017 |
| CN | 106997585 | 8/2017 |
| CN | 107832667 | 3/2018 |
| CN | 108269250 | 7/2018 |
| CN | 108269254 | 7/2018 |

OTHER PUBLICATIONS

Extended European Search Report issued in Corresponding European Application No. 19851576.9, dated Sep. 29, 2021.

Yang et al., "Visual attention guided image fusion with sparse representation" *Optik* 2014, 125, 4881-4888.

International Search Report and Written Opinion issued in Corresponding PCT Application No. PCT/CN2019/100363, dated Oct. 28, 2019.

"Research on the quality assessment of bayonet face image based on multi-feature fusion" *China Academic Journal Electronic Publishing House*, 2018, 57 pages (English Abstract provided).

Office Action issued in Corresponding Chinese Application No. 201810969026.5, dated Apr. 15, 2022 (English Translation provided).

* cited by examiner

IMAGE PROCESSING METHOD AND APPARATUS FOR TARGET RECOGNITION

CROSS REFERENCE TO RELATED APPLICATIONS

The present application is a national phase application under 35 U.S.C. § 371 of International Application No. PCT/CN2019/100363, filed Aug. 13, 2019, which claims the benefit of priority to Chinese patent application No. 201810969026.5, filed with the China National Intellectual Property Administration on Aug. 23, 2018 and entitled "image processing method and apparatus for target recognition", each of which are incorporated herein by reference in their entirety.

TECHNICAL FIELD

The present application relates to the technical field of image processing, in particular to an image processing method and apparatus for target recognition.

BACKGROUND

The target recognition technology is widely applied to various electronic systems such as an access control system, a traffic system, a gate system, and the like. A related target recognition technique is target recognition based on images taken by a monitoring device. Specifically, each time the monitoring device acquires one frame of image, feature extraction is performed on the acquired image, the extracted features are identified, and the target object is determined.

However, although the number of images including the target object captured by the monitoring device is big, the captured images have poor imaging quality such as images with different postures, sizes and degrees of blocking. Images with poor imaging quality do not provide clearly usable features for target recognition, which in turn results in reduced efficiency of target recognition. The extracted features of the whole image comprise the features of the non-target object and the features of the target object, and the features of the non-target object can influence target identification when the target identification is carried out, so that the accuracy of the target identification is influenced.

SUMMARY

The aim of the embodiment of the application is to provide an image processing method and apparatus for target recognition, so as to improve the accuracy rate of image quality evaluation of each frame of image, and improve the imaging quality of the final output target image. The specific technical solutions are as follows:

In a first aspect, the embodiment of the present application provides an image processing method for target recognition, comprising:

inputting N frames of images into a quality evaluation network model, wherein N is a positive integer;

determining, with the quality evaluation network model, a feature vector of each of the N frames of images according to an attention weight of a preset sub-region image and M quality evaluation parameters, wherein M is a positive integer;

determining quality evaluation values of the N frames of images according to the feature vectors of the N frames of images;

determining a target image or a target vector for target recognition according to the quality evaluation values of the N frames of images; the target image is an image in the N frames of images; the target vector is a feature vector in the feature vectors of the N frames of images.

Optionally, determining a feature vector of each of the N frames of images according to an attention weight of a preset sub-region image and M quality evaluation parameters, comprising:

determining, for each of the N frames of images, a plurality of sub-region images and an attention weight corresponding to each of the plurality of sub-region images;

performing feature extraction on each of the sub-region images to obtain a feature vector including M feature values, the M feature values correspond respectively to values of the M quality evaluation parameters;

determining the feature vector of each of the N frames of images according to the feature vector of each of the sub-region images and the attention weight corresponding to each of sub-region images.

Optionally, determining quality evaluation values of the N frames of images according to the feature vectors of the N frames of images, comprising:

determining initial quality evaluation values of the N frames of images according to the feature vectors of the N frames of images;

determining a fusion feature vector of the N frames of images according to the initial quality evaluation values of the N frames of images and the feature vectors of the N frames of images;

updating, according to the similarity between the fusion feature vector and a standard feature vector, the initial quality evaluation values of the N frames of images and obtaining the quality evaluation values of the N frames of images.

Optionally, determining initial quality evaluation values of the N frames of images according to the feature vectors of the N frames of images, comprising:

for each of the N frames of images, performing, according to weighting coefficients of the M feature values included by the feature vector of the frame of images, a weighted summation on the M feature values, and taking a value resulted from the weighted summation as the initial quality evaluation value of the frame of image.

Optionally, determining a fusion feature vector of the N frames of images according to the initial quality evaluation values of the N frames of images and the feature vectors of the N frames of images, comprising:

determining a fusion feature vector comprising M fusion feature values according to the initial quality evaluation values of the N frames of images and the feature vectors of the N frames of images, wherein the M fusion feature values are fusion feature values corresponding to the M quality evaluation parameters, and a fusion feature value corresponding to a first quality evaluation parameter is a weighted average value of a feature value corresponding to the first quality evaluation parameter in the N frames of images and the initial quality evaluation values of the N frames of images.

Optionally, updating, according to the similarity between the fusion feature vector and a standard feature vector, the initial quality evaluation values of the N frames of images and obtaining the quality evaluation value of the N frames of images, comprising:

adjusting, according to the similarity between the fusion feature vector and the standard feature vector, the weight coefficient of the M feature values corresponding to each of the N frames of images;

determining a quality evaluation value of each of the N frames of images according to the M feature values and the weight coefficients of the M feature values after adjustment.

Optionally, determining a target image or a target vector for target recognition according to the quality evaluation values of the N frames of images comprising:

determining a final fusion feature vector according to the quality evaluation values of the N frames of images and the feature vectors of the N frames of images, wherein the final fusion feature vector includes final fusion feature values corresponding to the M quality evaluation parameters; the final fusion feature value corresponding to the first quality evaluation parameter is a weighted average value of the feature value corresponding to the first quality evaluation parameter in the N frames of images and the quality evaluation values of the N frames of images;

generating a corresponding image according to the final fusion feature vector as the target image for target recognition; or determining the final fusion feature vector as the target vector for target recognition.

Optionally, determining a target image or a target vector for target recognition according to the quality evaluation values of the N frames of images comprising:

screening out P frames of key images from the N frames of images according to an order of the quality evaluation values of the N frames of images from big to small;

taking the P frames of key images as the target images; alternatively, determining weight coefficients of the P frames of key images after screening out the P frames of key images; determining a fusion image of the P frames of key images according to the P frames of images and the weight coefficients of the P frames of images, and taking the fusion image as the target image.

Optionally, the quality evaluation network model is determined by:

acquiring a preset neural network and a preset training set;

determining sub-region image of each of frames of sample images in the training set;

obtaining a first feature vector of each of the sub-region images by performing feature extraction on each of the determined sub-region images through the preset neural network;

obtaining a standard feature vector of a standard reference image by performing feature extraction on the standard reference image through the preset neural network;

evaluating imaging quality of each of the determined sub-region images based on the first feature vector of each of the sub-region images, to obtain an attention weight of each of the sub-region images;

for each of frames of sample images, weighting and averaging the first feature vectors of sub-region images according to an attention weight of each sub-region image included in each of frames of sample images, to obtain a second feature vector of each of frames of sample images;

evaluating, through the preset neural network, the imaging quality of each of frames of sample images based on the second feature vector of each of frames of sample images, to obtain a quality evaluation value of each of frames of sample images;

weighting and averaging second feature vectors of the frames of sample images according to the quality evaluation value of each of frames of sample images, to obtain the fusion feature vector for each sample target;

judging whether the preset neural network converges or not based on the obtained fusion feature vector and the standard feature vector;

if the preset neural network does not converge, adjusting parameters of the preset neural network, and returning to the step of obtaining a first feature vector of each of the sub-region images by performing feature extraction on each of the determined sub-region images through the preset neural network;

if the preset neural network converges, determining the currently obtained preset neural network as the quality evaluation network model.

In a second aspect, the embodiment of the present application provides an image processing apparatus for target recognition, comprising:

an input module, configured for inputting N frames of images into a quality evaluation network model, wherein N is a positive integer;

a first determining module, configured for determining, with the quality evaluation network model, a feature vector of each of the N frames of images according to an attention weight of a preset sub-region image and M quality evaluation parameters, wherein M is a positive integer;

a second determining module, configured for determining quality evaluation values of the N frames of images according to the feature vectors of the N frames of images;

determining a target image or a target vector for target recognition according to the quality evaluation values of the N frames of images; the target image is an image in the N frames of images; the target vector is a feature vector in the feature vectors of the N frames of images.

Optionally, the first determining module is specifically configured for:

determining, for each of the N frames of images, a plurality of sub-region images and an attention weight corresponding to each of the plurality of sub-region images;

performing feature extraction on each of the sub-region images to obtain a feature vector including M feature values, the M feature values correspond respectively to values of the M quality evaluation parameters;

determining the feature vector of each of the N frames of images according to the feature vector of each of the sub-region images and the attention weight corresponding to each of the sub-region images.

Optionally, the second determining module comprises:

a first determining sub-module, configured for determining initial quality evaluation values of the N frames of images according to the feature vectors of the N frames of images;

a second determining sub-module, configured for determining a fusion feature vector of the N frames of images according to the initial quality evaluation values of the N frames of images and the feature vectors of the N frames of images;

an updating sub-module, configured for updating, according to the similarity between the fusion feature vector and a standard feature vector, the initial quality evaluation values of the N frames of images and obtaining the initial quality evaluation value of the N frames of images.

Optionally, the first determining module is specifically configured for:

for each of the N frames of images, performing, according to weighting coefficients of the M feature values included by the feature vector of each of the N frames of images, a weighted summation on the M feature values, and taking a value resulted from the weighted summation as the initial quality evaluation value of the frame of image.

Optionally, the second determining sub-module is specifically configured for:

determining a fusion feature vector comprising M fusion feature values according to the initial quality evaluation values of the N frames of images and the feature vectors of the N frames of images, wherein the M fusion feature values are fusion feature values corresponding to the M quality evaluation parameters, and a fusion feature value corresponding to a first quality evaluation parameter is a weighted average value of a feature value corresponding to the first quality evaluation parameter in the N frames of images and the initial quality evaluation values of the N frames of images.

Optionally, the updating sub-module is specifically configured for:

adjusting, according to the similarity between the fusion feature vector and the standard feature vector, the weight coefficient of the M feature values corresponding to each of the N frames of images;

determining a quality evaluation value of each of the N frames of images according to the M feature values and the weight coefficients of the M feature values after adjustment.

Optionally, the third determining module is specifically configured for:

determining a final fusion feature vector according to the quality evaluation values of the N frames of images and the feature vectors of the N frames of images, wherein the final fusion feature vector includes final fusion feature values corresponding to the M quality evaluation parameters; the final fusion feature value corresponding to the first quality evaluation parameter is a weighted average value of the feature value corresponding to the first quality evaluation parameter in the N frames of images and the quality evaluation values of the N frames of images;

generating a corresponding image according to the final fusion feature vector as the target image for target recognition; or determining the final fusion feature vector as the target vector for target recognition.

Optionally, the third determining module is specifically configured for:

screening out P frames of key images from the N frames of images according to an order of the quality evaluation values of the N frames of images from big to small;

taking the P frames of key images as the target images; alternatively, determining weight coefficients of the P frames of key images after screening out the P frames of key images; determining a fusion image of the P frames of key images according to the P frames of images and the weight coefficients of the P frames of images, and taking the fusion image as the target image.

Optionally, the quality evaluation network model is determined by:

acquiring a preset neural network and a preset training set;

determining sub-region image of each of frames of sample images in the training set;

obtaining a first feature vector of each of the sub-region images by performing feature extraction on each of the determined sub-region images through the preset neural network;

obtaining a standard feature vector of a standard reference image by performing feature extraction on the standard reference image through the preset neural network;

evaluating imaging quality of each of the determined sub-region images based on the first feature vector of each of the sub-region images, to obtain an attention weight of each of the sub-region images;

for each of the sample image, weighting and averaging the first feature vectors of sub-region images according to an attention weight of each sub-region image included in each of frames of sample images, to obtain a second feature vector of each of frames of sample images;

evaluating, through the preset neural network, the imaging quality of each of frames of sample images based on the second feature vector of each of frames of sample images, to obtain a quality evaluation value of each of frames of sample images;

weighting and averaging second feature vectors of the frames of sample images according to the quality evaluation value of each of frames of sample images, to obtain the fusion feature vector for each sample target;

judging whether the preset neural network converges or not based on the obtained fusion feature vector and the standard feature vector;

if the preset neural network does not converge, adjusting parameters of the preset neural network, and returning to the step of obtaining a first feature vector of each of the sub-region images by performing feature extraction on each of the determined sub-region images through the preset neural network;

if the preset neural network converges, determining the currently obtained preset neural network as the quality evaluation network model.

In a third aspect, the embodiment of the present application further provides an electronic device, comprising a processor, a communication interface, a memory, and a communication bus, wherein the processor, the communication interface, and the memory realize mutual communication through the communication bus;

the memory is configured to store computer programs;

the processor is configured to implement the method steps described in any one of the above image processing methods for target recognition when executing the computer programs stored in the memory.

In a forth aspect, the embodiment of the present application further provides a computer-readable storage medium, wherein computer programs are stored thereon, when the computer programs are executed by a processor, the method steps according to any one of the above image processing methods for target recognition are realized.

In a fifth aspect, the embodiment of the present application further provides a computer program product which, when executed on a computer, causes the computer to perform method steps of any one of the above image processing methods for target recognition in the first aspect.

In the technical solution provided by the embodiments of the present application, N frames of images are input into a quality evaluation network model; with the quality evaluation network model, a feature vector of each of the N frames of images is determined according to an attention weight of a preset sub-region image and M quality evaluation parameters; quality evaluation values of the N frames of images are determined according to the feature vectors of the N frames of images; a target image or a target vector for target recognition is determined according to the quality evaluation values of the N frames of images.

According to the technical solutions provided by the embodiments of the present application, the feature vector of each frame of image is determined by the quality evaluation network model based on the attention weight of the sub-region image and M quality evaluation parameters. That is to say, each frame of image is evaluated according to the attention weight of the sub-region image and M quality evaluation parameters, which improves the accuracy of image quality evaluation of each frame of image. The quality evaluation value is obtained according to the feature vector of the image, which improves the imaging quality of the target image for the target image determined by the quality evaluation values.

BRIEF DESCRIPTION OF THE DRAWINGS

In order to more clearly describe the technical solutions of the embodiments of the present application and of the prior art, accompanying drawings that need to be used in embodiments and in the prior art will be briefly described below. Obviously, accompanying drawings described below are for only some of embodiments of the present application; those skilled in the art may also obtain other accompanying drawings based on these accompanying drawings without any creative efforts.

FIG. 7-1 is a second process diagram of an image processing method for target recognition provided by an embodiment of the present application;

FIG. 7-2 is a third process diagram of an image processing method for target recognition provided by an embodiment of the present application;

FIG. 7-3 is a forth process diagram of an image processing method for target recognition provided by an embodiment of the present application;

DETAILED DESCRIPTION

In order to make the objective, technical solutions and advantages of the present application more clear, the present application is described below in detail with reference to the accompanying drawings and by way of example. Obviously, the described embodiments are only some, and not all, of the embodiments of the present application. All other embodiments obtained based on the embodiments of the present application by those skilled in the art without any creative efforts fall into the scope of protection defined by the present application.

In order to improve the accuracy rate of image quality evaluation of each frame of image and the imaging quality of the final output target image, the embodiment of the application provides an image processing method for target recognition, comprising:

inputting N frames of images into a quality evaluation network model, wherein N is a positive integer;

determining, with the quality evaluation network model, a feature vector of each of the N frames of images according to an attention weight of a preset sub-region image and M quality evaluation parameters, wherein M is a positive integer;

determining quality evaluation values of the N frames of images according to the feature vectors of the N frames of images;

determining a target image or a target vector for target recognition according to the quality evaluation values of the N frames of images; the target image is an image in the N frames of images; the target vector is a feature vector in the feature vectors of the N frames of images.

In the technical solution provided by the embodiment of the present application, N frames of images are input into a quality evaluation network model; with the quality evaluation network model, a feature vector of each of the N frames of images is determined according to an attention weight of a preset sub-region image and M quality evaluation parameters; quality evaluation values of the N frames of images are determined according to the feature vectors of the N frames of images; a target image or a target vector for target recognition is determined according to the quality evaluation values of the N frames of images. According to the technical solution provided by the embodiment of the present application, the feature vector of each frame of image is determined by the quality evaluation network model based on the attention weight of the sub-region image and M quality evaluation parameters. That is to say, each of the N frames of images is evaluated according to the attention weight of the sub-region image and M quality evaluation parameters, which improves the accuracy of image quality evaluation of each frame of image. The quality evaluation value is obtained according to the feature vector of the image, which improves the imaging quality of the target image for the target image determined by the quality evaluation value.

Figure 1:
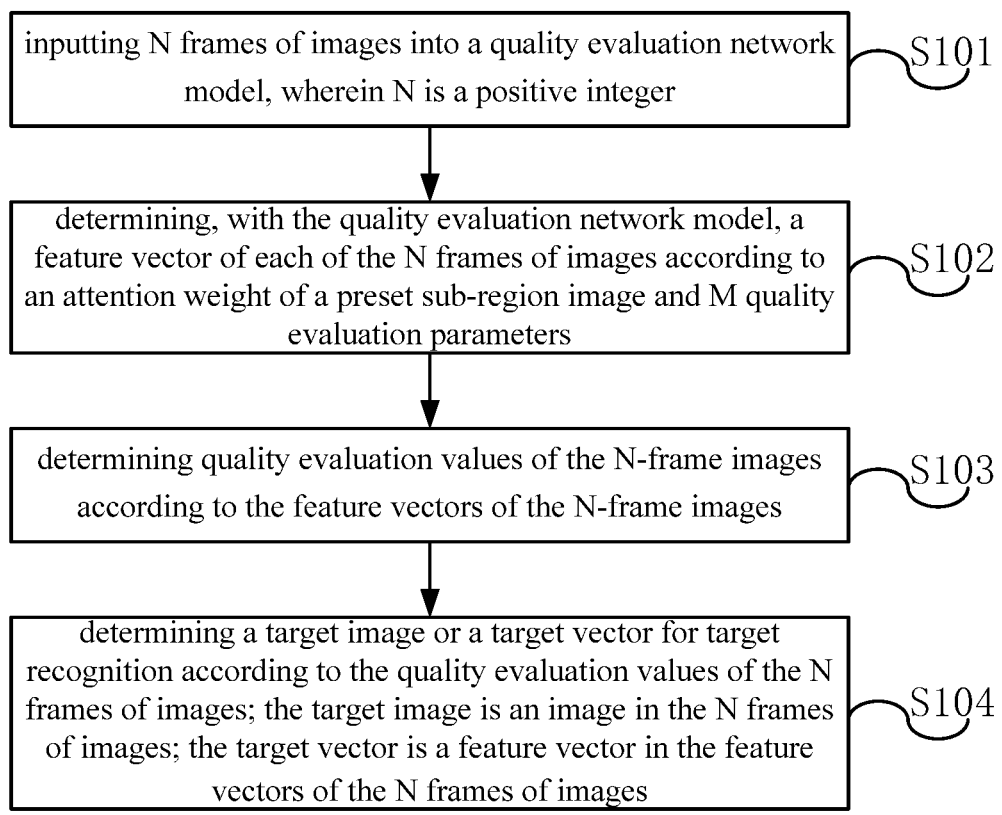
FIG. 1 is a first flow chart of an image processing method for target recognition provided by an embodiment of the present application.

Firstly, an image processing method for target recognition provided by the embodiment of the application is introduced. As shown in FIG. 1, the image processing method for target recognition includes the following steps.

At S101, N frames of images are input into a quality evaluation network model.

Wherein N is a positive integer and N can be a user-defined setting. For example, if N is 100, 100 frames of images are input into the quality evaluation network model.

In one embodiment, the N frames of images are images containing the same target object. Wherein, the target object is the target for target recognition. For example, if the target recognition is performed on a vehicle with a license plate of Jing A.12345, the vehicle with a license plate of Jing A.12345 is the target object.

Target objects can be of various types. According to different user requirements, target objects are different. For example, target objects in traffic systems can be vehicles, target objects in access control systems can be human faces, and target objects in security monitoring systems can be pedestrians.

Among them, the quality evaluation network model is the model obtained by training the preset neural network with multiple training sets. The quality evaluation network model can be any neural network based on CNN (Convolutional Neural Networks), RNN (Recurrent Neural Networks), DNN (Deep Neural Networks), etc., which is not limited here.

The training set includes multiple image sets, and each of the image sets includes multiple frames of sample images for the same sample target. Among them, the sample target can be customized, including vehicles, faces, pedestrians, etc.

For example, the preset training set includes image set 1, image set 2 and image set 3. Among them, image set 1 includes 1000 images, all of which are images of vehicle A; image set 2 includes 2000 images, all of which are images of face A; image set 3 includes 500 images, all of which are images of pedestrian A.

Each of the image sets of the training set also includes a standard reference image, and each of the image sets includes at least one standard reference image. The standard reference image is used to compare with other sample images in the image set.

At S102, with the quality evaluation network model, a feature vector of each of the N frames of images is determined according to an attention weight of a preset sub-region image and M quality evaluation parameters.

Wherein M is a positive integer and M can be a user-defined setting. Each quality evaluation parameter can be regarded as a dimension for the quality evaluation network model to evaluate the image or the sub-region image in the image, that is, the quality evaluation network model can determine the feature vector of each frame of image in the sub-region image or in the N frames of images from M dimensions.

The quality evaluation parameters can include posture, occlusion, size, illumination and ambiguity, etc.

The posture is the deflection angle of target objects such as pedestrians and vehicles, for example, the deflection angle, pitch angle and rotation angle of human face.

The occlusion can be divided into fixed occlusion and non fixed occlusion. Fixed occlusion means that the relative position of the occlusion object and the target object is fixed, and it will not change in general. For example, for the fixed occlusion of the target object as the face, it can be the occlusion of the hat, sunglasses, mask and other objects on the face. Non fixed occlusion means that the relative position of the occlusion object and the target object is not fixed. For example, blocking the face with hands or other people belongs to non fixed occlusion.

The size refers to the size of target object in the image to be recognized, which is used to represent the size of target object in the image to be recognized. Different target objects can be measured in different ways. For example, the size of the face is represented by the distance between the pupils of the eyes, the size of the pedestrian is expressed by the height, and the size of the vehicle is represented by the distance between the left and right rear-view mirrors.

The illumination refers to whether the brightness of the target object presented by the image to be recognized is uniform. Overexposure, darkness and uneven brightness of the image to be recognized can lead to the unclear texture of the target object in the image to be recognized.

The ambiguity refers to the clarity of the key texture edges of the target object in the image to be recognized. The representation of the key texture edges of the target object in the image to be recognized can represent the target object. For example, for a human face, the key texture edge is the edge of the five senses, and if the edge of the five senses is clear, the face can be presented; for the pedestrian, the key texture edge is the edge of the limbs and trunk, and if the edge of the limbs and trunk is clear, the pedestrian can be presented; for vehicles, the key texture edges include license plate characters, car body, lights and windows, and if the edges of license plate characters, body, lights and windows are clear, the vehicle can be presented.

Of course, the quality evaluation parameters are not limited to the above five types, but can also be other types of quality evaluation parameters, which are not limited here.

Each frame of image can include multiple sub-region images, and each of the sub-region images can be preset. For each of the sub-region images, there is a corresponding attention weight. The attention weight of the sub-region image is used to indicate the importance of the sub-region image in the image. Generally speaking, the bigger the value of attention weight, the higher the importance; the smaller the value of attention weight, the lower the importance.

For example, a face image includes two sub-region images: the first sub-region image and the second sub-region image, where the first sub-region image includes the face and the second the sub-region image only includes the background image region. Then, for the face image, the importance of the first sub-region image is far greater than that of the second sub-region image, and the attention weight of the first sub-region image is greater than that of the second sub-region image.

In one implementation, for each of the N frames of images, multiple sub-region images included in each frame of image can be determined. After multiple sub-region images are determined, the attention weight of each of the sub-region images can be determined.

After determining sub-region image of each frame of image and the corresponding attention weight of each of the sub-region images, feature extraction is performed on each of the sub-region images to obtain the feature vector including M feature vectors.

Among them, M feature values correspond to the values of M quality evaluation parameters.

The quality evaluation network model can extract features of each of the sub-region images according to the preset M quality evaluation parameters. Each quality evaluation parameter corresponds to a feature value, so that the feature vector of each sub-region image includes M feature values.

For example, according to the five quality evaluation parameters of posture, occlusion, size, illumination and ambiguity, the feature vector of the sub-region image in the face image is extracted, and the feature vector including five feature vectors is obtained, which is expressed as (a1, a2, a3, a4, a5), that is, the feature vector is the feature vector for the sub-region image. Among them, a1 is the feature vector of posture, a2 is the feature vector of occlusion, a3 is the feature vector of size, a4 is the feature vector of illumination, and a5 is the feature vector of ambiguity.

the feature vector of each of the N frames of images is determined according to the feature vector of each of the sub-region images and the attention weight corresponding to each of the sub-region images after obtaining the feature vector of the sub-region image.

Specifically, each of the sub-region images corresponds to a feature vector, and each of the sub-region images corresponds to an attention weight. The weighted feature vector of the sub-region image can be obtained by weighting the feature vector and attention weight of each of the sub-region images.

Then the weighted feature vectors corresponding to each sub-region image in each frame of image are averaged. Specifically, by averaging the values of the same quality evaluation parameter of each sub-region image in each frame of image, the average value of each quality evaluation parameter can be obtained. The new feature vector composed of the average value of each quality evaluation parameter is the image feature vectors.

For example, an image includes the sub-region image 1, the sub-region image 2 and the sub-region image 3, where the feature vectors of the sub-region image1 are (a1, a2, a3), the feature vectors of the sub-region image 2 are (b1, b2, b3), and the features of the sub-region image 3 are Vectors are (c1, c2, c3), where the same quality evaluation parameter for a1, b1 and c1 is the first quality evaluation parameter, the same quality evaluation parameter for a2, b2 and c2 is the second quality evaluation parameter, and the same quality evaluation parameter for a3, b3 and c3 is the third quality evaluation parameter. The attention weight of the sub-region image 1 is $\alpha$, the attention weight of the sub-region image 2 is $\beta$, and the attention weight of the sub-region image 3 is $\gamma$. Then, after weighting the sub-region image 1, the sub-region image 2 and the sub-region image 3, the vector features obtained are respectively: $(\alpha \cdot a1, \alpha \cdot a2, \alpha \cdot a3)$, $(\beta \cdot b1, \beta \cdot b2, \beta \cdot b3)$, $(\gamma \cdot c1, \gamma \cdot c2, \gamma \cdot c3)$; wherein, $\alpha \cdot a1$ represents $\alpha$ times a1, and the expression method in the embodiment of the application indicates multiplication calculation. After the weighted feature vectors are obtained, the corresponding value of the first quality evaluation parameter is $(\alpha \cdot a1 + \beta \cdot b1 + \gamma \cdot c2)/3$, the corresponding value of the second quality evaluation parameter is $(\alpha \cdot a2 + \beta \cdot b2 + \gamma \cdot c2)/3$ and the corresponding value of the third quality evaluation parameter is $(\alpha \cdot a3 + \beta \cdot b3 + \gamma \cdot c3)/3$ respectively. Then, the obtained feature vector is $(\alpha \cdot a1 + \beta \cdot b1 + \gamma \cdot c3)/3$, $(\alpha \cdot a2 + \beta \cdot b2 + \gamma \cdot c2)/3$, $(\alpha \cdot a3 + \beta \cdot b3 + \gamma \cdot c3)/3$, that is, the feature vectors of the frame image.

At S103, quality evaluation values of the N frames of images are determined according to the feature vectors of the N frames of images.

Among them, the quality evaluation value of each frame of image can be considered to reflect the image quality of the frame. Generally speaking, the bigger the quality evaluation value is, the better the image quality is. The smaller the quality evaluation value, the worse the image quality. Among them, the quality evaluation value of each frame of image can be the final quality evaluation value of the frame image, or the intermediate quality evaluation value of the frame image, which are both reasonable.

Feature vectors of each of the N frames of images are feature vectors including M feature values. According to M quality evaluation parameters, the quality evaluation value of each frame of image can be determined.

Figure 2:
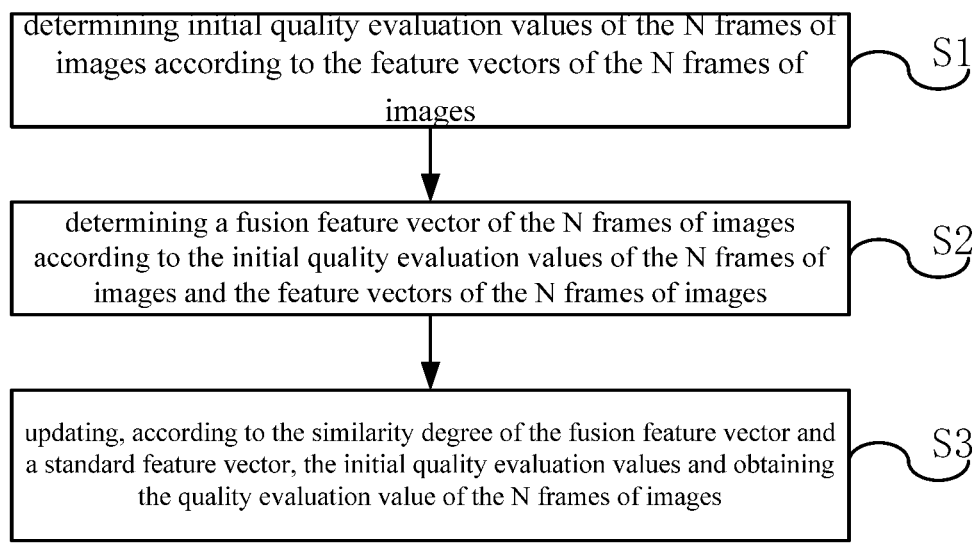
FIG. 2 is a second flow chart of an image processing method for target recognition provided by an embodiment of the present application.

In one implementation, as shown in FIG. 2, determining the quality evaluation value of the N frames of images according to the feature vectors of the N frames of images may include the following steps.

At S1, initial quality evaluation values of the N frames of images are determined according to the feature vectors of the N frames of images.

At S2, a fusion feature vector of the N frames of images is determined according to the initial quality evaluation values of the N frames of images and the feature vectors of the N frames of images.

At S3, according to the similarity between the fusion feature vector and a standard feature vector, the initial quality evaluation values of the N frames of images are updated and the quality evaluation values of the N frames of images are obtained.

The above steps S1-S3 are described below.

At S1, initial quality evaluation values of the N frames of images is determined according to the feature vectors of the N frames of images.

In one implementation, for each of the N frames of images, performing, according to weighting coefficients of the M feature values included by the feature vector of each of the N frames of images, a weighted summation on the M feature values, and taking a value resulted from the weighted summation as the initial quality evaluation value of the frame of image.

For each frame of image, each quality evaluation parameter in the feature vectors of each frame of image is evaluated respectively, and then the initial quality evaluation value of each frame of image is obtained by synthesizing the evaluation results of each quality evaluation parameter.

For example, for face recognition, the M quality evaluation parameters include posture, occlusion, size, illumination and ambiguity, and evaluations are applied to each frame of image in terms of five quality evaluation parameters including posture, occlusion, size, illumination and ambiguity, then the initial quality evaluation value of the image can be obtained by integrating the evaluation results of the five quality evaluation parameters of posture, occlusion, size, illumination and ambiguity.

Among them, for pose evaluation, the ratio between the key points of target object can be used to evaluate the posture features, and the key points of target object can be set by user. For occlusion evaluation, the region where the target object is located can be segmented by user in advance, and the occlusion probability of each part of the region can be calculated by using the trained occlusion probability model. For size evaluation, the size distance between the preset position points of target object is detected. For example, the distance between left and right pupil is calculated when target object is a face. For the evaluation of ambiguity, sharpness calculation formula and energy gradient function are used for measurement.

The evaluation result of each quality evaluation parameter can be a score, that is, the feature value. When the initial quality evaluation value of each frame of image is obtained by integrating the feature values of each quality evaluation parameter, the initial quality evaluation value of each frame of image can be obtained by weighted summation of the feature values of each quality evaluation parameter.

For example, the feature vectors of an image include three quality evaluation parameters: the posture, the occlusion and the size. Among them, the weight coefficient of the posture is 0.4, the weight coefficient of the occlusion is 0.4, and the weight coefficient of the size is 0.2; after each quality evaluation parameter is evaluated, the feature value of the pose is 80, the feature value of the occlusion is 70, and the feature value of the size is 60, the initial quality evaluation value of the image after weighted summation is $80 \times 0.4 + 70 \times 0.4 + 60 \times 0.2 = 74$.

Among them, the weight coefficients of the initial M feature values can be user-defined.

S2, a fusion feature vector of the N frames of images is determined according to the initial quality evaluation value of the N frames of images and the feature vectors of the N frames of images.

In one implementation, a fusion feature vector of the N frames of images is determined according to the initial quality evaluation values of the N frames of images and the feature vectors of the N frames of images.

wherein the M fusion feature values are fusion feature values corresponding to the M quality evaluation parameters; the fusion feature value corresponding to the first quality evaluation parameter is a weighted average value of the feature value corresponding to each of the quality evaluation parameter in the N frames of images and the initial quality evaluation values of the N frames of images.

Specifically, each frame of image corresponds to a feature vector, and each frame of image corresponds to an initial quality evaluation value. By weighting the feature vectors of each frame of image with the initial quality evaluation value, the weighted feature vectors of the frame image can be obtained.

Then the weighted feature vectors corresponding to each image in the N frames of images are averaged. Specifically, by averaging the values of the same quality evaluation parameter of each image to be recognized in the N frames of images, the average value of each quality evaluation parameter can be obtained. The new feature vector composed of the average value of each quality evaluation parameter is called fusion feature vectors.

For example, the N frames of images include image 1, image 2 and image 3, where feature vector of image 1 is (a1, a2, a3), the feature vector of image 2 is (b1, b2, b3), and the feature vector of image 3 is (c1, c2, c3), where the same quality evaluation parameter for a1, b1 and c1 is the first quality evaluation parameter, the same quality evaluation parameter for a2, b2 and c2 is the second quality evaluation parameter, and the same quality evaluation parameter for a3, b3 and c3 is the third quality evaluation parameter. The initial quality evaluation value of image 1 is $\alpha$, that of image 2 is $\beta$, and that of image 3 is $\gamma$. Then, after weighted calculation of image 1, image 2 and image 3, the feature vectors obtained are: ($\alpha \cdot$a1, $\alpha \cdot$a2, $\alpha \cdot$a3), ($\beta \cdot$b1, $\beta \cdot$b2, $\beta \cdot$b3), ($\gamma \cdot$c1, $\gamma \cdot$c2, $\gamma \cdot$c3); wherein, $\alpha \cdot$a1 represents a times a1, and the expression method in the embodiment of the application all represents multiplication calculation. After the weighted feature vectors are obtained, the corresponding value of the first quality evaluation parameter is ($\alpha \cdot$a1+$\beta \cdot$b1+$\gamma \cdot$c1)/3, the corresponding value of the second quality evaluation parameter is ($\alpha \cdot$a2+$\beta \cdot$b2+$\gamma \cdot$c2)/3 and the corresponding value of the third quality evaluation parameter is ($\alpha \cdot$a3+$\beta \cdot$b3+$\gamma \cdot$c3)/3 respectively. Then, the obtained fusion feature vector is (($\alpha \cdot$a1+$\beta \cdot$b1+$\gamma \cdot$c1)/3, ($\alpha \cdot$a2+$\beta \cdot$b2+$\gamma \cdot$c2)/3, ($\alpha \cdot$a3+$\beta \cdot$b3+$\gamma \cdot$c3)/3).

Through the initial quality evaluation values and the image feature vectors, the fusion feature vectors including M fusion feature values are obtained. The fusion feature vectors collect the M feature values in the image feature vectors. Moreover, the greater the contribution of each feature value to the image quality, the greater the corresponding quality evaluation value of the feature values, and the greater the proportion of each feature value in the fusion feature vectors. In this way, the image quality of fusion feature vectors is higher.

At S3, according to the similarity between the fusion feature vector and a standard feature vector, the initial quality evaluation values of the N frames of images are updated and the quality evaluation values of the N frames of images are obtained.

In one implementation, according to the similarity between the fusion feature vector and the standard feature vector, the weight coefficient of the M feature values corresponding to each of the N frames of images is adjusted.

Among them, the standard feature vectors can be preset as a reference standard. For the feature values in fusion feature vector which is closer to the standard feature vectors, the weight coefficient of the feature values is adjusted to be bigger than the current feature values; for the feature values in the fusion feature vector with a bigger gap from the standard feature vectors, the weight coefficient of the feature values is adjusted to be smaller than the current feature values.

For example, image feature vectors include pose, occlusion and size. Among them, the weight coefficient of pose is 0.4, the weight coefficient of occlusion is 0.4, and the weight coefficient of size is 0.2. By comparing fusion feature vector with the standard feature vector, the similarity of pose, occlusion and size with the standard feature vector, the feature value of the posture is the closest to the standard feature vector, followed by the size feature value, and the difference between the occlusion feature value and the standard feature vector is relatively big. Therefore, the weight coefficient of the posture can be adjusted to 0.6, the weight coefficient of size to 0.3, and the weight coefficient of occlusion to 0.1.

After adjusting the weight coefficients of M feature values corresponding to each frame of image in the N frames of images, the quality evaluation value of each frame of image in the N frames of images is determined according to the M feature values and the weight coefficients adjusted by M feature values.

When determining the quality evaluation value of each frame of image, the feature values of each quality evaluation parameter can be weighted and summed to obtain the quality evaluation value of each frame of image.

For example, the feature vector of an image includes five quality evaluation parameters: the posture, the occlusion, the size, the illumination and the ambiguity. Among them, the weight coefficient of the posture is 0.1, the weight coefficient of the occlusion is 0.2, the weight coefficient of the size is 0.3, the weight coefficient of the illumination is 0.2, and the weight coefficient of the ambiguity is 0.2 The vector is (80, 60, 50, 50, 40), that is, the feature value of the pose is 80, the feature value of the occlusion is 60, the feature value of the size is 50, the feature value of the illumination is 50, and the feature value of the ambiguity is 40. Then the quality evaluation value of the weighted sum image is: 80×0.1+60×0.2+50×0.3+50×0.2+40×0.2=53.

By comparing the similarity between fusion feature vector and standard feature vector, the weight coefficient can be adjusted correspondingly. In case a greater contribution of feature value made to image quality, that is, the higher the similarity degree, the weight coefficient of the feature value will be increased. If the contribution of the feature value to the image quality is smaller, that is, the similarity degree is lower, the weight coefficient of the feature value is reduced. In this way, the final fusion feature vector will be more similar to the image corresponding to the standard feature vector, and the improved image quality is higher.

At S104, a target image or a target vector for target recognition is determined according to the quality evaluation values of the N frames of images.

In one implementation, a final fusion feature vector is determined according to the quality evaluation values of the N frames of images and the feature vectors of the N frames of images, a corresponding image is generated according to the final fusion feature vector as the target image for target recognition; or determining the final fusion feature vector as the target vector for target recognition.

wherein the final fusion feature vector includes final fusion feature values corresponding to the M quality evaluation parameters; the final fusion feature value corresponding to each quality evaluation parameter is a weighted average value of the feature value corresponding to each of the quality evaluation parameter in the N frames of images and the quality evaluation values of the N frames of images.

Specifically, each frame of image corresponds to a feature vector, and each frame of image corresponds to a quality evaluation value. The weighted feature vector of the image can be obtained by weighting the feature vector and the quality evaluation value of each of image.

Then the weighted feature vectors corresponding to each image in the N frames of images are averaged. Specifically, by averaging the values of the same quality evaluation parameter of each image to be identified in the N frames of images, the average value of each quality evaluation parameter can be obtained. The new feature vector composed of the average value of the quality evaluation parameters is the final fusion feature vector.

In one implementation, P frames of key images are screened out from the N frames of images according to an order of the quality evaluation values of the N frames of images from big to small and taken as the target images.

Where P is a positive integer not greater than N, and P can be user-defined.

After getting the quality evaluation value of each frame of image, the quality evaluation value can be sorted from big to small, and the P frames of key images can be selected as the target images in the order of quality evaluation value from big to small.

For example, N is 4, and the N frames of images are image 1, image 2, image 3 and image 4, where the quality evaluation value of image 1 is 70, the quality evaluation value of image 2 is 80, the quality evaluation value of image 3 is 65, and the quality evaluation value of image 4 is 85. According to the order of quality evaluation value from big to small: image 4, image 2, image 1, image 3. If P is 2, image 4 and image 2 are taken as target images.

Through this implementation, not only P frames of images with better imaging quality are selected, but also the number of images with better imaging quality selected is less than the number of the N frames of images obtained. In this way, the number of subsequent target recognition images will be reduced, and the burden of target recognition will be reduced.

In one implementation, P frames of key images are screened out from the N frames of images according to an order of the quality evaluation values of the N frames of images from big to small; the weight coefficients of the P frames of key images are determined after screening out the P frames of key images; a fusion image of the P frames of key images is determined according to the P frames of images and the weight coefficients of the P frames of images, and taking the fusion image as the target image.

The weight coefficient of an image is determined according to the image quality of the image. Generally speaking, the higher the image quality, the greater the weight coefficient of the image. The bigger the weight coefficient in P frames of key images, the greater the proportion of P frames of key images in the fusion image.

For example, if P is 2 and P frames of key images include image 1 and image 2, where the weight coefficient of image 1 is 80% and that of image 2 is 20%, then in the fusion image of image 1 and image 2, the proportion of image 1 is far greater than that of image 2.

In the technical solution provided by the embodiment of the present application, N frames of images are input into a quality evaluation network model; with the quality evaluation network model, a feature vector of each of the N frames of images is determined according to an attention weight of a preset sub-region image and M quality evaluation parameters; quality evaluation values of the N frames of images are determined according to the feature vectors of the N frames of images; a target image for target recognition is determined according to the quality evaluation values of the N frames of images. According to the technical solution provided by the embodiment of the present application, the feature vector of each frame of image is determined by the quality evaluation network model based on the attention weight of the sub-region image and M quality evaluation parameters. That is to say, each frame of image is evaluated according to the attention weight of the sub-region image and M quality evaluation parameters, which improves the accuracy of image quality evaluation of each frame of image. The quality evaluation value is obtained according to the feature vector of the image, which improves the imaging quality of the target image for the target image determined by the quality evaluation value.

Figure 3:
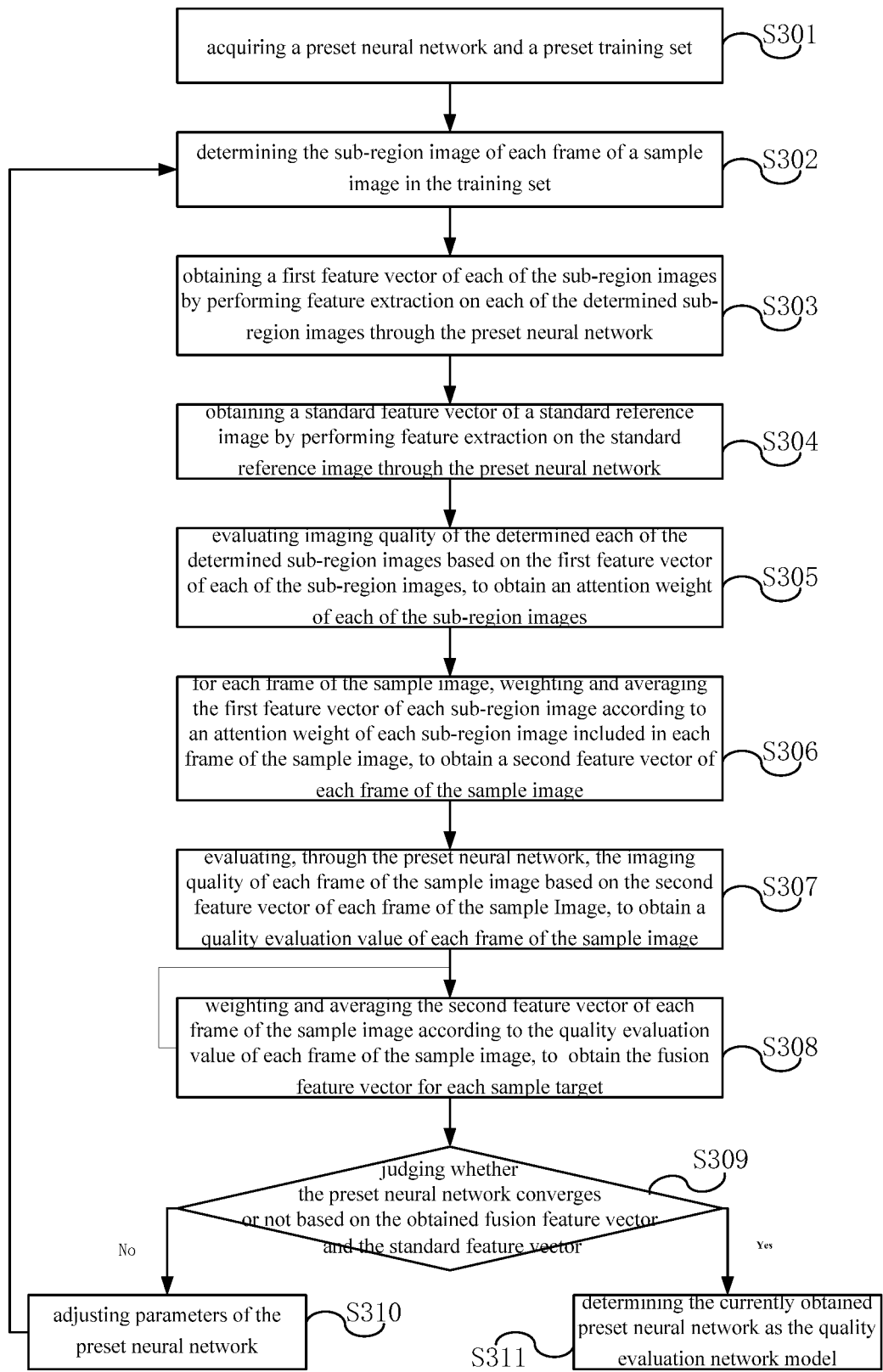
FIG. 3 is a flow chart for training a preset neural network provided by an embodiment of the present application.

In one embodiment, for the quality evaluation network model, as shown in FIG. 3, the preset neural network can be obtained by training the preset neural network in the following steps.

At S301, a preset neural network and a preset training set are acquired.

Among them, the preset neural network and training set can be customized. The training set includes multiple image sets, and each image set includes multi frame sample images and standard reference images for the same sample target.

Figure 4:
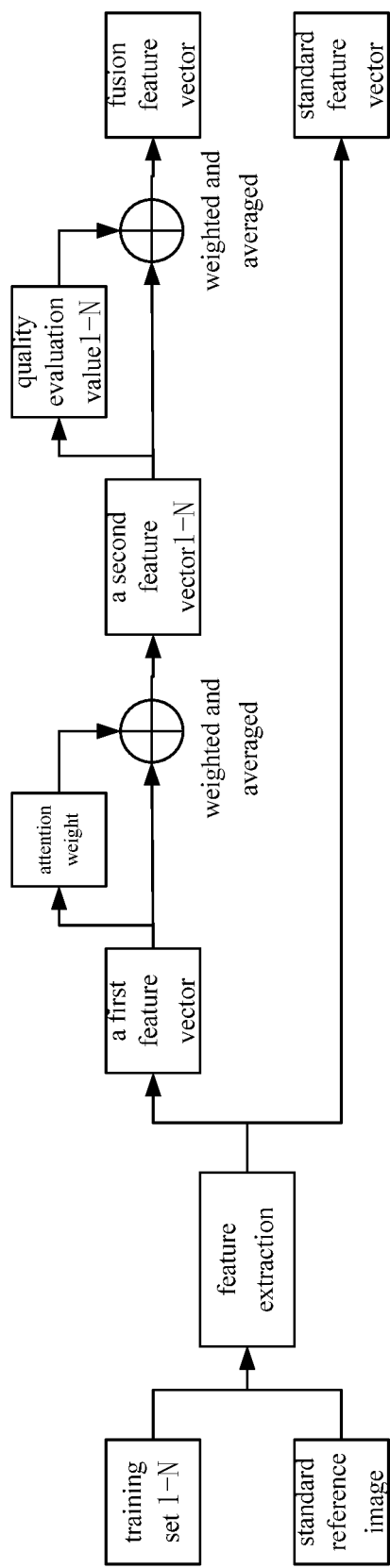
FIG. 4 is a process diagram for training a preset neural network provided by an embodiment of the present application.

Combined with FIG. 4, the preset neural network is CNN network. The preset training set includes N frames of sample images, and each frame of sample image is numbered sequentially by 1-N.

At S302, the sub-region image of each of frames of sample images in the training set is determined.

At S303, through the preset neural network, a first feature vector of each of the sub-region images is obtained by performing feature extraction on each of the determined sub-region images.

As shown in FIG. 4, after the N frames of images are input to the preset neural network, the preset neural network can extract the features of each determined sub-region image to obtain the first feature vector for each sub-region image.

At S304, through the preset neural network, a standard feature vector of a standard reference image is obtained by performing feature extraction on the standard reference image.

As shown in FIG. 4, the standard reference image is input into the preset neural network, and the preset neural network performs feature extraction on the standard reference image to obtain the standard feature vector.

The execution sequence between steps S303 and S304 is not limited, that is, S304 can be executed first and then S303 can be executed.

At S305, based on the first feature vector of each of the sub-region images, imaging quality of each of the determined sub-region images is evaluated, and then an attention weight of each of the sub-region images is obtained.

As shown in FIG. 4, based on the first feature vector, the imaging quality of each of the determined sub-region images is evaluated, and an attention weight of each of the sub-region images is obtained.

At S306, according to an attention weight of each sub-region image included in each of frames of sample images, the first feature vector of each sub-region image for each of frames of sample images is weighted and averaged for each of frames of sample images, and then a second feature vector of each of frames of sample images is obtained.

As shown in FIG. 4, taking each of frames of sample images as the unit, the attention weight of the sub-region image belonging to the same frame sample image and the first feature vector are weighted and averaged to obtain the second feature vector for each sample image. In this way, N second feature vectors can be obtained.

At S307, through the preset neural network, the imaging quality of each of frames of sample images is evaluated based on the second feature vector of each of frames of sample images, then a quality evaluation value of each of frames of sample images is obtained.

As shown in FIG. 4, the image quality of each of frames of sample images is evaluated based on the second feature vector numbered 1-N, and the corresponding quality evaluation value with the number of 1-N can be obtained.

At S308, according to the quality evaluation value of each of frames of sample images, the second feature vector of each of frames of sample images is weighted and averaged, and the fusion feature vector for each sample target is obtained.

As shown in FIG. 4, the corresponding fusion feature vector can be obtained by weighted averaging the quality evaluation value numbered 1-N and the second feature vector numbered 1-N respectively.

At S309, whether the preset neural network converges or not is judged based on the obtained fusion feature vector and the standard feature vector; if the preset neural network doesn't converge, perform S310; and if the preset neural network converges, perform S311.

As shown in FIG. 4, the fusion feature vector obtained is compared with the standard feature vector of the standard reference image to judge whether the preset neural network converges.

In one implementation, firstly, the fusion feature vector is calculated forward by the preset neural network.

Specifically, the forward calculation of the preset neural network with parameter set $\Theta_i$ is carried out for the comprehensive feature vector of image set $\Omega$ in the training set. The current parameter set is $\Theta_1$ when entering forward calculation processing for the first time. When entering forward calculation processing again, the current parameter set $\Theta_{i-1}$ is obtained by adjusting the previous parameter set $\Theta_i$.

After the forward calculation, the similarity between the standard feature vector and fusion feature vector of the standard reference image is calculated.

Among them, the similarity is expressed as a percentage. The greater the percentage, the higher the similarity between the feature vector and fusion feature vector of the standard reference image, and 100% means that the standard feature vector and fusion feature vector of the standard reference image are the same.

Based on the similarity obtained, the convergence of the preset neural network is judged. Specifically, whether the similarity is less than the preset similarity threshold is judged. When the similarity is less than the preset similarity threshold, determining that it is not convergent; when the similarity is not less than the preset similarity threshold, determining that it is convergent.

If the preset neural network does not converge, then perform step S310, that is, adjust the parameters of the preset neural network. In one implementation mode, numerical optimization methods such as gradient descent can be used for adjustment. Specifically, the gradient descent method is used to adjust the current parameter set $\Theta_i$ of the preset neural network. And return to execution step S203.

If the preset neural network converges, perform S311, that is determining the currently obtained preset neural network as the quality evaluation network model.

In the technical solution provided by the embodiment of the present application, N frames of images are input into a quality evaluation network model; with the quality evaluation network model, a feature vector of each of the N frames of images is determined according to an attention weight of a preset sub-region image and M quality evaluation parameters; quality evaluation values of the N frames of images are determined according to the feature vectors of the N frames of images; a target image for target recognition is determined according to the quality evaluation values of the N frames of images. According to the technical solution provided by the embodiment of the present application, the feature vector of each frame of image is determined by the quality evaluation network model based on the attention weight of the sub-region image and M quality evaluation parameters. That is to say, each frame of image is evaluated according to the attention weight of the sub-region image and M quality evaluation parameters, which improves the accuracy of image quality evaluation of each frame of image. The quality evaluation value is obtained according to the feature vector of the image, which improves the imaging quality of the target image for the target image determined by the quality evaluation value.

Figure 5:
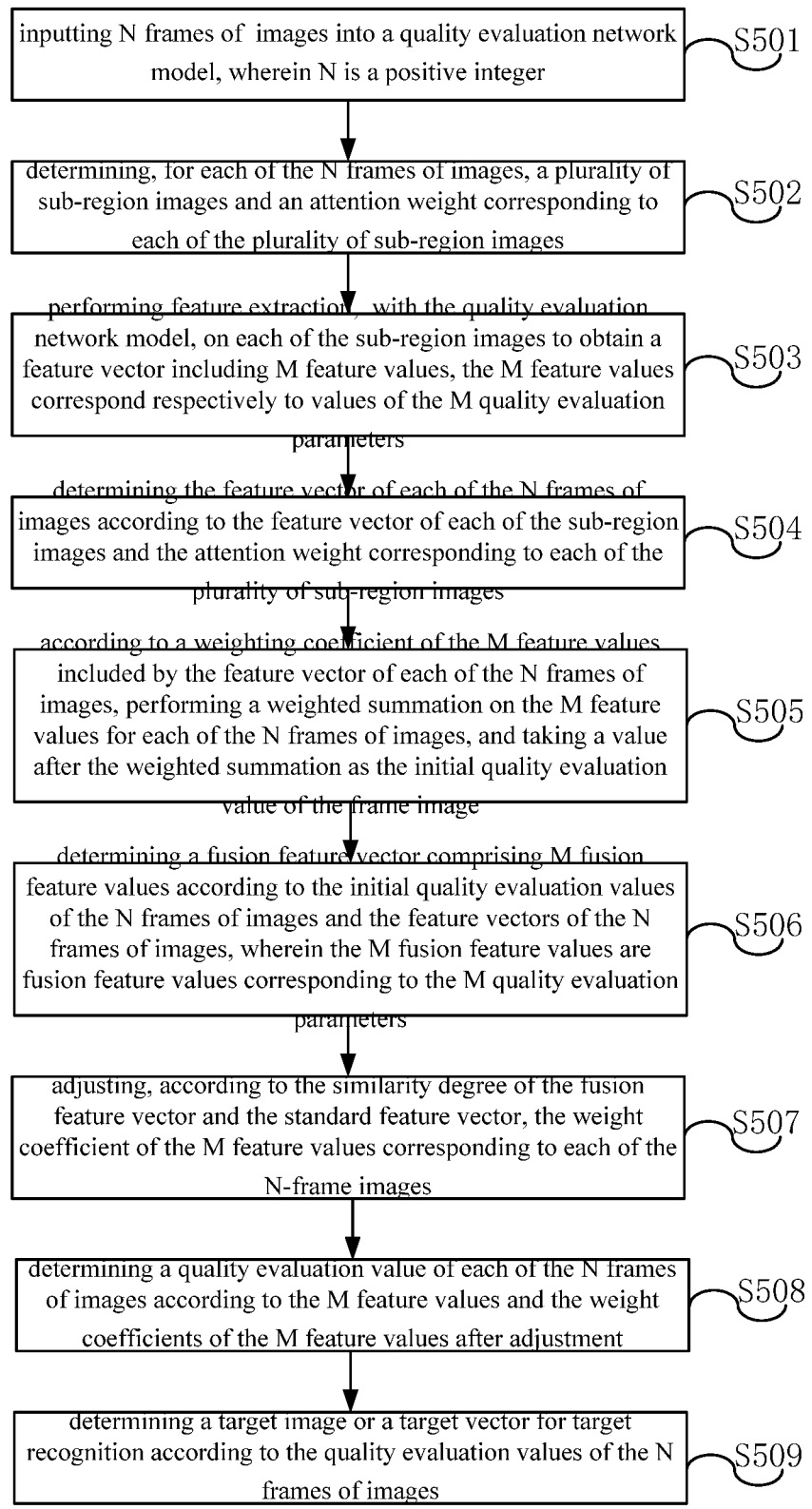
FIG. 5 is a third flow chart of an image processing method for target recognition provided by an embodiment of the present application.

The embodiment of the present application also provides an image processing method for target recognition, as shown in FIG. 5, including the following steps.

At S501, N frames of images are input into a quality evaluation network model.

Figure 6:
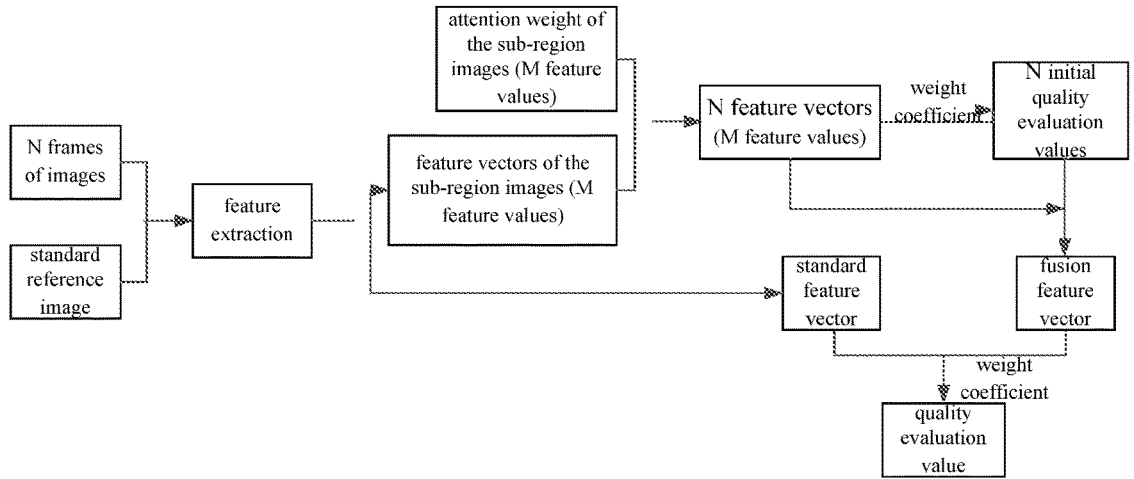
FIG. 6 is a first process diagram of an image processing method for target recognition provided by an embodiment of the present application.

As illustrated in FIG. 6, the N frames of images are input into the quality evaluation network model.

At S502, for each of the N frames of images, a plurality of sub-region images and an attention weight corresponding to each of the plurality of sub-region images are determined by the quality evaluation network model.

Each frame of image can contain multiple sub-region images, and the sub-region image can be determined according to the object of target recognition. For example, if an image contains two objects with target recognition, the image can contain three sub-region images, of which two of the sub-region images contain an object respectively, and the other one is a region other than the two sub-region images mentioned above as a sub-region image.

The attention weight corresponding to each of the sub-region images is determined according to the number of objects in the sub-region image containing target recognition. The more the sub-region image contains, the greater the corresponding attention weight is; the less the sub-region image contains, the smaller the attention weight is.

At S503, feature extraction is performed by the quality evaluation network model on each of the sub-region images to obtain a feature vector including M feature values, the M feature values correspond respectively to values of the M quality evaluation parameters.

As shown in FIG. 6, the quality evaluation model extracts features from each of the sub-region images in each frame of image to obtain a feature vector of M feature values.

At S504, the feature vector of each of the N frames of images is determined by the quality evaluation network model according to the feature vector of each of the sub-region images and the attention weight corresponding to each of the plurality of sub-region images.

As shown in FIG. 6, the feature vector of the image may be obtained according to the feature vector of each of the sub-region images and the attention weight corresponding to each of the sub-region images.

Specifically, taking each frame of image as the unit, the feature vector of the sub-region image belonging to the same frame image is weighted summed with the attention weight to obtain the feature vector of the frame image.

At S505, according to weighting coefficients of the M feature values included by the feature vector of each of the N frames of images, a weighted summation on the M feature values for each of the N frames of images is performed by the quality evaluation network model, and taking a value resulted from the weighted summation as the initial quality evaluation value of the frame of image.

As shown in FIG. 6, after the feature vectors of each frame of image are obtained, the weighted summation of M feature values in each feature vector can be used to determine the initial quality evaluation value corresponding to the frame image.

At S506, a fusion feature vector comprising M fusion feature values is determined by the quality evaluation network model according to the initial quality evaluation values of the N frames of images and the feature vectors of the N frames of images, wherein the M fusion feature values are fusion feature values corresponding to the M quality evaluation parameters.

The fusion feature value corresponding to the first quality evaluation parameter is the weighted average value of the feature value corresponding to the first quality evaluation parameter in the N frames of images and the initial quality evaluation value of the N frames of images.

As shown in FIG. 6, according to the feature vector of the N frames of images and the initial quality evaluation value of the N frames of images, the fusion feature vector can be obtained.

At S507, according to the similarity between the fusion feature vector and the standard feature vector, the weight coefficient of the M feature values corresponding to each of the N frames of images is adjusted by the quality evaluation network model.

At S508, a quality evaluation value of each of the N frames of images is determined by the quality evaluation network model according to the M feature values and the weight coefficients of the M feature values after adjustment.

As shown in FIG. 6, each fusion feature vector obtained is compared with the standard feature vector, and then the weight coefficient of M feature values corresponding to each frame of image can be adjusted. The quality evaluation value of each frame of image can be determined by weighting the adjusted weight coefficient with M feature values corresponding to the weight coefficient.

At S509, a target image or a target vector for target recognition is determined according to the quality evaluation values of the N frames of images.

Figures 1, 7:
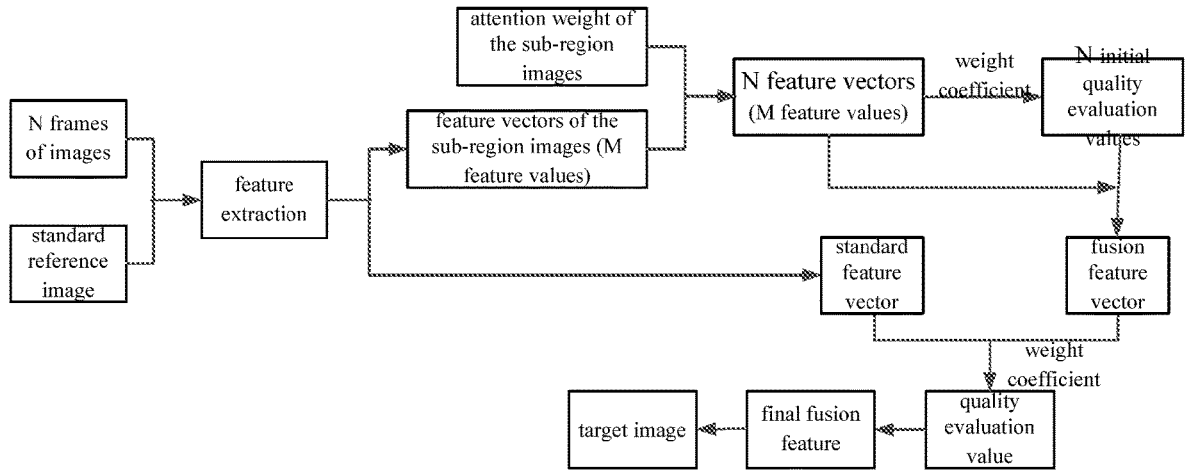
Figures 2, 7:
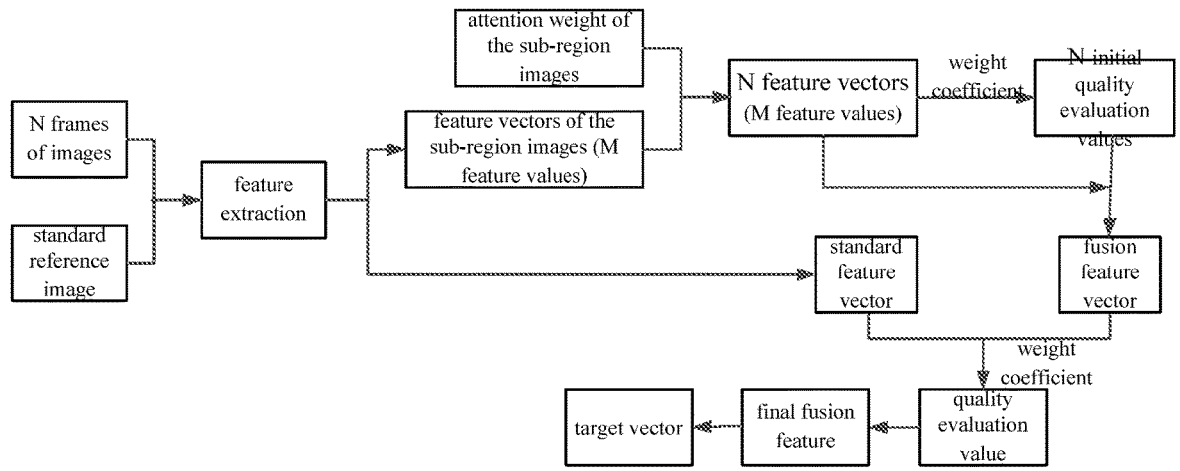
Figures 3, 7:
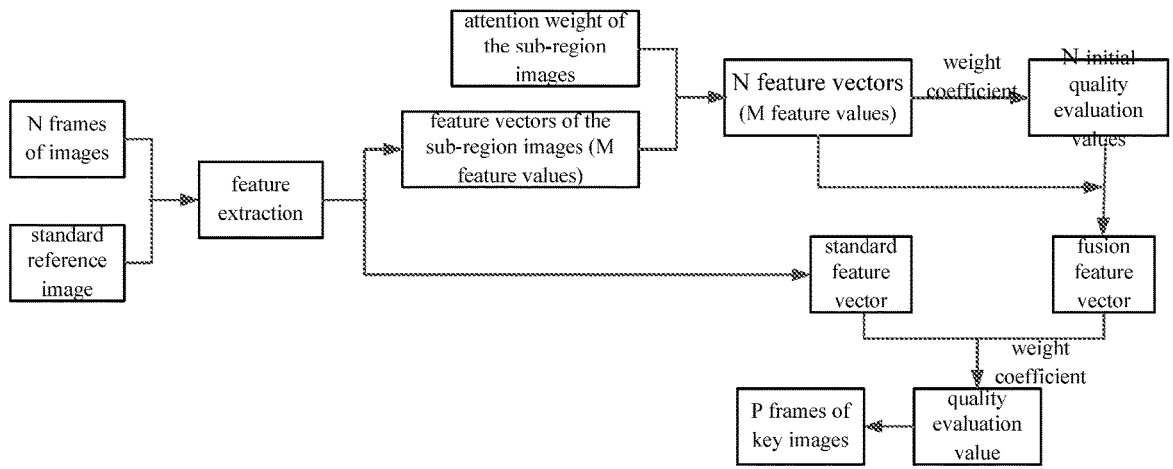

In one implementation, a final fusion feature vector is determined according to the quality evaluation values of the N frames of images and the feature vectors of the N frames of images, wherein the final fusion feature vector includes final fusion feature values corresponding to the M quality evaluation parameters; the final fusion feature value corresponding to the first quality evaluation parameter is a weighted average value of the feature value corresponding to the first quality evaluation parameter in the N frames of images and the quality evaluation values of the N frames of images;

As shown in FIG. 7-1, the corresponding image is generated according to the final fusion feature vector as the target image for target recognition. Or, as shown in FIG. 7-2, determine the final fusion feature vector as the target vector for target recognition.

In another implementation, as shown in FIG. 7-3, P frames of key images are screened out from the N frames of images according to an order of the quality evaluation values of the N frames of images from big to small.

The P frames of key images are taken as the target images; alternatively, weight coefficients of the P frames of key images are determined after screening out the P frames of key images; a fusion image of the P frames of key images is determined according to the P frames of images and the weight coefficients of the P frames of images, and the fusion image is taken as the target image.

Among them, the above steps S502-S509 are not limited to the quality evaluation network model in the application, but also can be realized by using multiple function modules or models, or by using one or more devices, which is not limited here.

Figure 8:
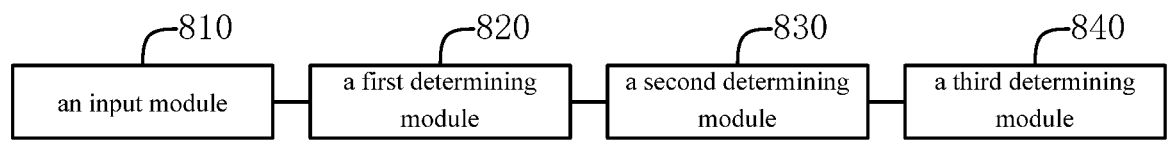
FIG. 8 is a structure diagram of an image processing method for target recognition provided by an embodiment of the present application.

Corresponding to the above-mentioned image processing method embodiment for target recognition, the embodiment of the application also provides an image processing device for target recognition, as shown in FIG. 8. The image processing for target recognition includes:

an input module 810, configured for inputting N frames of images into a quality evaluation network model, wherein N is a positive integer;

a first determining module 820, configured for determining, with the quality evaluation network model, a feature vector of each of the N frames of images according to an attention weight of a preset sub-region image and M quality evaluation parameters, wherein M is a positive integer;

a second determining module 830, configured for determining quality evaluation values of the N frames of images according to the feature vectors of the N frames of images;

a third determining module 840, configured for determining a target image or a target vector for target recognition according to the quality evaluation values of the N frames of images; the target image is an image in the N frames of images; the target vector is a feature vector in the feature vectors of the N frames of images.

Optionally, the first determining module 820 is specifically configured for:

determining, for each of the N frames of images, a plurality of sub-region images and an attention weight corresponding to each of the plurality of sub-region images;

performing feature extraction on each of the sub-region images to obtain a feature vector including M feature values, the M feature values correspond respectively to values of the M quality evaluation parameters;

determining the feature vector of each of the N frames of images according to the feature vector of each of the sub-region images and the attention weight corresponding to each of the sub-region images.

Optionally, the second determining module 830 comprises:

a first determining sub-module, configured for determining an initial quality evaluation values of the N frames of images according to the feature vectors of the N frames of images;

a second determining sub-module, configured for determining a fusion feature vector of the N frames of images according to the initial quality evaluation values of the N frames of images and the feature vectors of the N frames of images;

an updating sub-module, configured for updating, according to the similarity between the fusion feature vector and a standard feature vector, the initial quality evaluation values of the N frames of images and obtaining the initial quality evaluation value of the N frames of images.

Optionally, the third determining module is specifically configured for:

for each of the N frames of images, performing, according to weighting coefficients of the M feature values included by the feature vector of each of the N frames of images, a weighted summation on the M feature values, and taking a value resulted from the weighted summation as the initial quality evaluation value of the frame of image.

Optionally, the second determining sub-module is specifically configured for:

determining a fusion feature vector comprising M fusion feature values according to the initial quality evaluation values of the N frames of images and the feature vectors of the N frames of images, wherein the M fusion feature values are fusion feature values corresponding to the M quality evaluation parameters, and a fusion feature value corresponding to a first quality evaluation parameter is a weighted average value of a feature value corresponding to the first quality evaluation parameter in the N frames of images and the initial quality evaluation values of the N frames of images.

Optionally, the updating sub-module is specifically configured for:

adjusting, according to the similarity between the fusion feature vector and the standard feature vector, the weight coefficient of the M feature values corresponding to each of the N frames of images;

determining a quality evaluation value of each of the N frames of images according to the M feature values and the weight coefficients of the M feature values after adjustment.

Optionally, the third determining module 840 is specifically configured for:

determining a final fusion feature vector according to the quality evaluation values of the N frames of images and the feature vectors of the N frames of images, wherein the final fusion feature vector includes final fusion feature values corresponding to the M quality evaluation parameters; the final fusion feature value corresponding to the first quality evaluation parameter is a weighted average value of the feature value corresponding to the first quality evaluation parameter in the N frames of images and the quality evaluation values of the N frames of images;

generating a corresponding image according to the final fusion feature vector as the target image for target recognition; or determining the final fusion feature vector as the target vector for target recognition.

Optionally, the third determining module 840 is specifically configured for:

screening out P frames of key images from the N frames of images according to an order of the quality evaluation values of the N frames of images from big to small;

the P frames of key images are taken as the target images; alternatively, weight coefficients of the P frames of key images are determined after screening out the P frames of key images; a fusion image of the P frames of key images is determined according to the P frames of images and the weight coefficients of the P frames of images, and the fusion image is taken as the target image.

Optionally, the quality evaluation network model is determined by:

acquiring a preset neural network and a preset training set;

determining sub-region image of each of frames of sample images in the training set;

obtaining a first feature vector of each of the sub-region images by performing feature extraction on each of the determined sub-region images through the preset neural network;

obtaining a standard feature vector of a standard reference image by performing feature extraction on the standard reference image through the preset neural network;

evaluating imaging quality of each of the determined sub-region images based on the first feature vector of each of the sub-region images, to obtain an attention weight of each of the sub-region images;

for each of the sample image, weighting and averaging the first feature vectors of sub-region images according to an attention weight of each sub-region image included in each of frames of sample images, to obtain a second feature vector of each of frames of sample images;

evaluating, through the preset neural network, the imaging quality of each of frames of sample images based on the second feature vector of each of frames of sample images, to obtain a quality evaluation value of each of frames of sample images;

weighting and averaging second feature vectors of the frames of sample images according to the quality evaluation value of each of frames of sample images, to obtain the fusion feature vector for each sample target;

judging whether the preset neural network converges or not based on the obtained fusion feature vector and the standard feature vector;

if the preset neural network does not converge, adjusting parameters of the preset neural network, and returning to the step of obtaining a first feature vector of each of the sub-region images by performing feature extraction on each of the determined sub-region images through the preset neural network;

if the preset neural network converges, determining the currently obtained preset neural network as the quality evaluation network model.

In the technical solution provided by the embodiment of the present application, N frames of images are input into a quality evaluation network model; with the quality evaluation network model, a feature vector of each of the N frames of images is determined according to an attention weight of a preset sub-region image and M quality evaluation parameters; quality evaluation values of the N frames of images are determined according to the feature vectors of the N frames of images; a target image or a target vector for target recognition is determined according to the quality evaluation values of the N frames of images. According to the technical solution provided by the embodiment of the present application, the feature vector of each frame of image is determined by the quality evaluation network model based on the attention weight of the sub-region image and M quality evaluation parameters. That is to say, each frame of image is evaluated according to the attention weight of the sub-region image and M quality evaluation parameters, which improves the accuracy of image quality evaluation of each frame of image. The quality evaluation value is obtained according to the feature vector of the image, which improves the imaging quality of the target image for the target image determined by the quality evaluation value.

Figure 9:
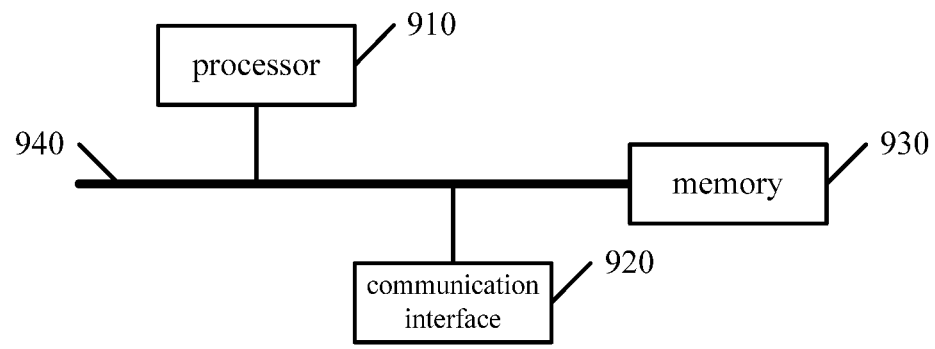
FIG. 9 is a schematic structural diagram of an electronic device provided by an embodiment of the application.

The embodiment of the present application further provides an electronic device, as shown in FIG. 9, comprising a processor 910, a communication interface 920, a memory 930, and a communication bus 940, wherein the processor 910, the communication interface 920, and the memory 930 realize mutual communication through the communication bus 940;

the memory 930 configured to store computer programs;

the processor 910 is configured for executing the computer programs stored in the memory 930, so as to perform the following steps:

inputting N frames of images into a quality evaluation network model, wherein N is a positive integer;

determining, with the quality evaluation network model, a feature vector of each of the N frames of images according to an attention weight of a preset sub-region image and M quality evaluation parameters, wherein M is a positive integer;

determining quality evaluation values of the N frames of images according to the feature vectors of the N frames of images;

determining a target image or a target vector for target recognition according to the quality evaluation values of the N frames of images; the target image is an image in the N frames of images; the target vector is a feature vector in the feature vectors of the N frames of images.

In the technical solution provided by the embodiment of the present application, N frames of images are input into a quality evaluation network model; with the quality evaluation network model, a feature vector of each of the N frames of images is determined according to an attention weight of a preset sub-region image and M quality evaluation parameters; quality evaluation values of the N frames of images are determined according to the feature vectors of the N frames of images; a target image or a target vector for target recognition is determined according to the quality evaluation values of the N frames of images. According to the technical scheme provided by the embodiment of the present application, the feature vector of each frame of image is determined by the quality evaluation network model based on the attention weight of the sub-region image and M quality evaluation parameters. That is to say, each frame of image is evaluated according to the attention weight of the sub-region image and M quality evaluation parameters, which improves the accuracy of image quality evaluation of each frame of image. The quality evaluation value is obtained according to the feature vector of the image, which improves the imaging quality of the target image for the target image determined by the quality evaluation value.

The electronic device provided by the embodiment of the application may also perform an image determination method for target recognition described in any of the above embodiments.

The communication bus in the above electronic device may be a Peripheral Component Interconnect (PCI) bus or an Extended Industry Standard Architecture (EISA) bus and the like. The communication bus may include an address bus, a data bus, a control bus, and the like. For ease of presentation, the communication bus is denoted by a thick line in the drawings. However, this does not mean that there is only one bus or one type of bus.

The communication interface is used for communication between the above electronic device and other devices.

The memory may be a Random Access Memory (RAM) or a Non-Volatile Memory (NVM). At least one disk storage may also be included in the device. Optionally, the memory may also be at least one storage device remote from the aforementioned processor.

The above processor may be a general-purpose processor, such as a Central Processing Unit (CPU) or a Network Processor (NP); or a Digital Signal Processing (DSP) device, an Application Specific Integrated Circuit (ASIC), a Field-Programmable Gate Array (FPGA) or other programmable logic device, discrete gate or transistor logic device, discrete hardware component.

In another embodiment provided by the present application, a computer-readable storage medium is also provided, which comprises computer programs stored thereon which, when executed by a processor, causes the processor to perform the image processing method for target recognition shown by the above-mentioned FIGS. 1, 2, 3, 4, 5, 6, 7-1, 7-2, 7-3 and the corresponding embodiments of FIGS. 1, 2, 3, 4, 5, 6, 7-1, 7-2 and 7-3.

In another embodiment provided by the present application, a computer program product is also provided, which is used for execution at runtime: any one of the above-mentioned FIGS. 1, 2, 3, 4, 5, 6, 7-1, 7-2, 7-3 and the corresponding embodiments of FIGS. 1, 2, 3, 4, 5, 6, 7-1, 7-2 and 7-3 is used for target Image processing method of recognition.

It should be noted that, in the claims and the specification of the invention, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise (s) a . . . " do not exclude that there are other identical elements in the processes, methods, objects, or devices that comprise that element.

Each embodiment in this specification is described in a related manner, and the same or similar parts between the various embodiments can be referred to each other. Each embodiment attentions on the differences from other embodiments. In particular, as for embodiments of an image processing apparatus for target recognition, an electronic device and a machine-readable storage medium, since they are basically similar to the method embodiment, the description is relatively simple, and the relevant part may refer to the description of the method embodiment.

The above descriptions are merely preferred embodiments of the present application, and are not intended to limit the protection scope of the present application. Any modification, equivalent replacement, and improvement made within the spirit and principle of this application fall within the protection scope of this application.

What is claimed is:

1. An image processing method for target recognition, comprising:

inputting N frames of images into a quality evaluation network model, wherein N is a positive integer;

determining, with the quality evaluation network model, a feature vector of each of the N frames of images according to an attention weight of a preset sub-region image and M quality evaluation parameters, wherein M is a positive integer;

determining quality evaluation values of the N frames of images according to the feature vectors of the N frames of images;

determining a target image or a target vector for target recognition according to the quality evaluation values of the N frames of images; the target image is an image in the N frames of images; the target vector is a feature vector in the feature vectors of the N frames of images;

wherein determining a feature vector of each of the N frames of images according to an attention weight of a preset sub-region image and M quality evaluation parameters comprises:

determining, for each of the N frames of images, a plurality of sub-region images and an attention weight corresponding to each of the plurality of sub-region images;

performing feature extraction on each of the sub-region images to obtain a feature vector including M feature values, the M feature values correspond respectively to values of the M quality evaluation parameters;

determining the feature vector of each of the N frames of images according to the feature vector of each of the sub-region images and the attention weight corresponding to each of the sub-region images;

wherein determining quality evaluation values of the N frames of images according to the feature vectors of the N frames of images comprises:

determining initial quality evaluation values of the N frames of images according to the feature vectors of the N frames of images;

determining a fusion feature vector of the N frames of images according to the initial quality evaluation values of the N frames of images and the feature vectors of the N frames of images;

updating, according to the similarity between the fusion feature vector and a standard feature vector, the initial quality evaluation values of the N frames of images and obtaining the quality evaluation values of the N frames of images.

2. The method according to claim 1, wherein determining initial quality evaluation values of the N frames of images according to the feature vectors of the N frames of images comprises:

for each of the N frames of images, performing, according to weighting coefficients of the M feature values included by the feature vector of the frame of image, a weighted summation on the M feature values, and taking a value resulted from the weighted summation as the initial quality evaluation value of the frame of image; or wherein determining a fusion feature vector of the N frames of images according to the initial quality evaluation values of the N frames of images and the feature vectors of the N frames of images comprising:

determining a fusion feature vector comprising M fusion feature values according to the initial quality evaluation values of the N frames of images and the feature vectors of the N frames of images, wherein the M fusion feature values are fusion feature values corresponding to the M quality evaluation parameters, and a fusion feature value corresponding to a first quality evaluation parameter is a weighted average value of a feature value corresponding to the first quality evaluation parameter in the N frames of images and the initial quality evaluation values of the N frames of images.

3. The method according to claim 1, wherein updating, according to the similarity between the fusion feature vector and a standard feature vector, the initial quality evaluation values of the N frames of images and obtaining the quality evaluation values of the N frames of images comprises:

adjusting, according to the similarity between the fusion feature vector and the standard feature vector, the weight coefficient of the M feature values corresponding to each of the N frames of images;

determining a quality evaluation value of each of the N frames of images according to the M feature values and the weight coefficients of the M feature values after adjustment.

4. The method according to claim 2, wherein determining a target image or a target vector for target recognition according to the quality evaluation values of the N frames of images comprises:

determining a final fusion feature vector according to the quality evaluation values of the N frames of images and the feature vectors of the N frames of images, wherein the final fusion feature vector includes final fusion feature values corresponding to the M quality evaluation parameters; the final fusion feature value corresponding to the first quality evaluation parameter is a weighted average value of the feature value corresponding to the first quality evaluation parameter in the N frames of images and the quality evaluation values of the N frames of images;

generating a corresponding image according to the final fusion feature vector as the target image for target recognition; or determining the final fusion feature vector as the target vector for target recognition.

5. The method according to claim 1, wherein determining a target image or a target vector for target recognition according to the quality evaluation values of the N frames of images comprises:

screening out P frames of key images from the N frames of images according to an order of the quality evaluation values of the N frames of images from big to small;

taking the P frames of key images as the target images; alternatively, determining weight coefficients of the P frames of key images after screening out the P frames of key images; determining a fusion image of the P frames of key images according to the P frames of images and the weight coefficients of the P frames of images, and taking the fusion image as the target image.

6. The method according to claim 1, wherein the quality evaluation network model is determined by:

acquiring a preset neural network and a preset training set;

determining sub-region image of each of frames of sample images in the training set;

obtaining a first feature vector of each of the sub-region images by performing feature extraction on each of the determined sub-region images through the preset neural network;

obtaining a standard feature vector of a standard reference image by performing feature extraction on the standard reference image through the preset neural network;

evaluating imaging quality of each of the determined sub-region images based on the first feature vector of each of the sub-region images, to obtain an attention weight of each of the sub-region images;

for each of frames of sample images, weighting and averaging the first feature vectors of sub-region images according to an attention weight of each sub-region image included in the frame of the sample image, to obtain a second feature vector of each of frames of sample images;

evaluating, through the preset neural network, the imaging quality of each of frames of sample images based on the second feature vector of each of frames of sample images, to obtain a quality evaluation value of each of frames of sample images;

weighting and averaging second feature vectors of the frames of sample images according to the quality evaluation value of each of frames of sample images, to obtain the fusion feature vector for each sample target;

judging whether the preset neural network converges or not based on the obtained fusion feature vector and the standard feature vector;

if the preset neural network does not converge, adjusting parameters of the preset neural network, and returning to the step of obtaining a first feature vector of each of the sub-region images by performing feature extraction on each of the determined sub-region images through the preset neural network;

if the preset neural network converges, determining the currently obtained preset neural network as the quality evaluation network model.

7. An image processing apparatus for target recognition, comprising:

an input module, configured for inputting N frames of images into a quality evaluation network model, wherein N is a positive integer;

a first determining module, configured for determining, with the quality evaluation network model, a feature vector of each of the N frames of images according to an attention weight of a preset sub-region image and M quality evaluation parameters, wherein M is a positive integer;

a second determining module, configured for determining quality evaluation values of the N frames of images according to the feature vectors of the N frames of images;

a third determining module, configured for determining a target image or a target vector for target recognition according to the quality evaluation values of the N frames of images; the target image is an image in the N frames of images; the target vector is a feature vector in the feature vectors of the N frames of images;

wherein the first determining module is specifically configured for:

determining, for each of the N frames of images, a plurality of sub-region images and an attention weight corresponding to each of the plurality of sub-region images;

performing feature extraction on each of the sub-region images to obtain a feature vector including M feature values, the M feature values correspond respectively to values of the M quality evaluation parameters;

determining the feature vector of each of the N frames of images according to the feature vector of each of the sub-region images and the attention weight corresponding to each of the sub-region images;

wherein the second determining module comprises:

a first determining sub-module, configured for determining initial quality evaluation values of the N frames of images according to the feature vectors of the N frames of images;

a second determining sub-module, configured for determining a fusion feature vector of the N frames of images according to the initial quality evaluation values of the N frames of images and the feature vectors of the N frames of images;

an updating sub-module, configured for updating, according to the similarity between the fusion feature vector and a standard feature vector, the initial quality evaluation values of the N frames of images and obtaining the initial quality evaluation value of the N frames of images.

8. The apparatus according to claim 7, wherein the first determining sub-module is specifically configured for:

for each of the N frames of images, performing, according to weighting coefficients of the M feature values included by the feature vector of each of the N frames of images, a weighted summation on the M feature values, and taking a value resulted from the weighted summation as the initial quality evaluation value of the frame of image.

9. The apparatus according to claim 7, wherein the second determining sub-module is specifically configured for:

determining a fusion feature vector comprising M fusion feature values according to the initial quality evaluation values of the N frames of images and the feature vectors of the N frames of images, wherein the M fusion feature values are fusion feature values corresponding to the M quality evaluation parameters, and a fusion feature value corresponding to a first quality evaluation parameter is a weighted average value of a feature value corresponding to the first quality evaluation parameter in the N frames of images and the initial quality evaluation values of the N frames of images.

10. The apparatus according to claim 7, wherein the updating sub-module is specifically configured for:

adjusting, according to the similarity between the fusion feature vector and the standard feature vector, the weight coefficient of the M feature values corresponding to each of the N frames of images;

determining a quality evaluation value of each of the N frames of images according to the M feature values and the weight coefficients of the M feature values after adjustment.

11. The apparatus according to claim 9, wherein the third determining module is specifically configured for:

determining a final fusion feature vector according to the quality evaluation values of the N frames of images and the feature vectors of the N frames of images, wherein the final fusion feature vector includes final fusion feature values corresponding to the M quality evaluation parameters; the final fusion feature value corresponding to the first quality evaluation parameter is a weighted average value of the feature value corresponding to the first quality evaluation parameter in the N frames of images and the quality evaluation values of the N frames of images;

generating a corresponding image according to the final fusion feature vector as the target image for target recognition; or determining the final fusion feature vector as the target vector for target recognition.

12. The apparatus according to claim 7, wherein the third determining module is specifically configured for:

screening out P frames of key images from the N frames of images according to an order of the quality evaluation values of the N frames of images from big to small;

taking the P frames of key images as the target images; alternatively, determining weight coefficients of the P frames of key images after screening out the P frames of key images; determining a fusion image of the P frames of key images according to the P frames of images and the weight coefficients of the P frames of images, and taking the fusion image as the target image.

13. The apparatus according to claim 7, wherein the quality evaluation network model is determined by:

acquiring a preset neural network and a preset training set;

determining sub-region image of each of frames of sample images in the training set;

obtaining a first feature vector of each of the sub-region images by performing feature extraction on each of the determined sub-region images through the preset neural network;

obtaining a standard feature vector of a standard reference image by performing feature extraction on the standard reference image through the preset neural network;

evaluating imaging quality of each of the determined sub-region images based on the first feature vector of each of the sub-region images, to obtain an attention weight of each of the sub-region images;

for each of the sample image, weighting and averaging the first feature vectors of sub-region images according to an attention weight of each sub-region image included in each of frames of sample images, to obtain a second feature vector of each of frames of sample images;

evaluating, through the preset neural network, the imaging quality of each of frames of sample images based on the second feature vector of each of frames of sample images, to obtain a quality evaluation value of each of frames of sample images;

weighting and averaging second feature vectors of the frames of sample images according to the quality evaluation value of each of frames of sample images, to obtain the fusion feature vector for each sample target;

judging whether the preset neural network converges or not based on the obtained fusion feature vector and the standard feature vector;

if the preset neural network does not converge, adjusting parameters of the preset neural network, and returning to the step of obtaining a first feature vector of each of the sub-region images by performing feature extraction on each of the determined sub-region images through the preset neural network;

if the preset neural network converges, determining the currently obtained preset neural network as the quality evaluation network model.

14. An electronic device, comprising a processor, a communication interface, a memory, and a communication bus, wherein the processor, the communication interface and the memory communicate with each other through the communication bus;

the memory is configured for storing computer programs;

the processor is configured for executing the computer programs stored in the memory, so as to perform method steps of claim 1.

15. A non-transitory computer-readable storage medium, comprising computer programs stored thereon which, when executed by a processor, causes the processor to perform method steps of claim 1.

* * * * *